US012761684B1

(12) United States Patent
Yeh et al.

(10) Patent No.: US 12,761,684 B1
(45) Date of Patent: Oct. 13, 2026

(54) BANDGAP REFERENCE VOLTAGE GENERATION DEVICE

(71) Applicant: NOVATEK MICROELECTRONICS CORP., Hsinchu (TW)

(72) Inventors: Chia-Jung Yeh, Hsinchu City (TW); Pai-Hsiang Hsu, Hsinchu City (TW); Yueh-Ru Lee, Chiayi City (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 19/220,339

(22) Filed: May 28, 2025

(51) Int. Cl.
*G05F 3/30* (2006.01)
*G05F 3/26* (2006.01)

(52) U.S. Cl.
CPC ................ *G05F 3/30* (2013.01); *G05F 3/267* (2013.01)

(58) Field of Classification Search
None
See application file for complete search history.

(56) References Cited

U.S. PATENT DOCUMENTS

| | | | | |
|---|---|---|---|---|
| 8,866,539 B2 * | 10/2014 | Sano | G05F 1/463 | 327/539 |
| 9,104,217 B2 * | 8/2015 | Arnold | G05F 3/267 | |
| 9,582,021 B1 * | 2/2017 | Arnold | G05F 3/16 | |
| 10,228,715 B2 * | 3/2019 | Segarra | G05F 3/30 | |
| 10,310,528 B1 * | 6/2019 | Elsayed | G05F 1/565 | |
| 10,642,305 B2 * | 5/2020 | Lee | G05F 3/265 | |
| 11,431,324 B1 * | 8/2022 | Finlinson | G05F 3/30 | |
| 2017/0177017 A1 | 6/2017 | Horng et al. | | |
| 2022/0413532 A1 | 12/2022 | Gupta et al. | | |
| 2023/0107389 A1 * | 4/2023 | Wu | G05F 3/30 | 323/313 |
| 2024/0338045 A1 * | 10/2024 | Nomura | G05F 3/30 | |

FOREIGN PATENT DOCUMENTS

| | | |
|---|---|---|
| CN | 1242548 C | 2/2006 |
| CN | 102419609 A | 4/2012 |
| CN | 102591398 A | 7/2012 |
| CN | 115129105 A | 9/2022 |
| TW | 386302 B | 4/2000 |
| TW | 202329123 A | 7/2023 |
| TW | 202329132 A | 7/2023 |

* cited by examiner

*Primary Examiner* — Thomas J. Hiltunen
(74) *Attorney, Agent, or Firm* — Birch, Stewart, Kolasch & Birch, LLP

(57) ABSTRACT

A bandgap reference voltage generation device includes at least one proportional to absolute temperature (PTAT) current generator, a bandgap reference voltage generation circuit, and a current compensator. The PTAT current generator generates a first proportional to absolute temperature (PTAT) current. The bandgap reference voltage generation circuit generates a second proportional to absolute temperature (PTAT) current whose positive temperature coefficient is different from the positive temperature coefficient of the first PTAT current. The current compensator is coupled to the PTAT current generator and the bandgap reference voltage generation circuit. The current compensator retrieves the first PTAT current and the second PTAT current, performs subtraction and addition on the first PTAT current and the second PTAT current to generate a compensation current, and transmits the compensation current to the bandgap reference voltage generation circuit to generate a zero temperature coefficient voltage.

18 Claims, 10 Drawing Sheets

BANDGAP REFERENCE VOLTAGE GENERATION DEVICE

BACKGROUND OF THE INVENTION

Field of the Invention

The invention relates to a voltage generation device, particularly to a bandgap reference voltage generation device.

Description of the Related Art

A stable reference voltage source or current source immune to temperature variation, e.g. a bandgap reference circuit, is usually applied in an analog circuit to provide a reference voltage or current, for maintaining accurate operations of a power source or other circuits. In short, a bandgap reference current source mixes currents/voltages of a proportional to absolute temperature (PTAT) and a complementary to absolute temperature (CTAT) with a proper ratio, to cancel out the PTAT and CTAT components, and generates a zero-temperature-correlated (zero-TC) current/voltage.

However, the zero-temperature-correlated voltage has a higher-order temperature correlation term, which causes greater voltage variations in the zero-temperature-correlated voltage-temperature curve. To reduce the effect of this higher-order correlation term, curve compensation technology is used to introduce a compensation current, which requires a larger area. Additionally, the temperature compensation technology is affected by process drift, making it disadvantageous for single-point temperature compensation. As a result, this technology does not meet the requirements for low-cost applications. Furthermore, the temperature compensation technology requires a negative temperature coefficient. In order to generate a CTAT current, the temperature compensation technology faces a trade-off between area and power consumption.

SUMMARY OF THE INVENTION

The invention provides a bandgap reference voltage generation device, which uses a simple circuit configuration to achieve low-cost and low-power temperature compensation without using any complementary to absolute temperature (CTAT) current.

In an embodiment of the invention, a bandgap reference voltage generation device, which includes at least one proportional to absolute temperature (PTAT) current generator, a bandgap reference voltage generation circuit, and a current compensator. The PTAT current generator is configured to generate a first proportional to absolute temperature (PTAT) current. The bandgap reference voltage generation circuit is configured to generate a second proportional to absolute temperature (PTAT) current whose positive temperature coefficient is different from the positive temperature coefficient of the first PTAT current. The current compensator is coupled to the PTAT current generator and the bandgap reference voltage generation circuit. The current compensator is configured to retrieve the first PTAT current and the second PTAT current, perform subtraction and addition on the first PTAT current and the second PTAT current to generate a compensation current, and transmit the compensation current to the bandgap reference voltage generation circuit to generate a zero temperature coefficient voltage.

To sum up, the bandgap reference voltage generation device uses the simple circuit configuration and performs subtraction and addition on the first PTAT current and the second PTAT current to generate the compensation current, thereby achieving low-cost and low-power temperature compensation without using any CTAT current.

Below, the embodiments are described in detail in cooperation with the drawings to make easily understood the technical contents, characteristics and accomplishments of the invention.

DETAILED DESCRIPTION OF THE INVENTION

Figure 1:
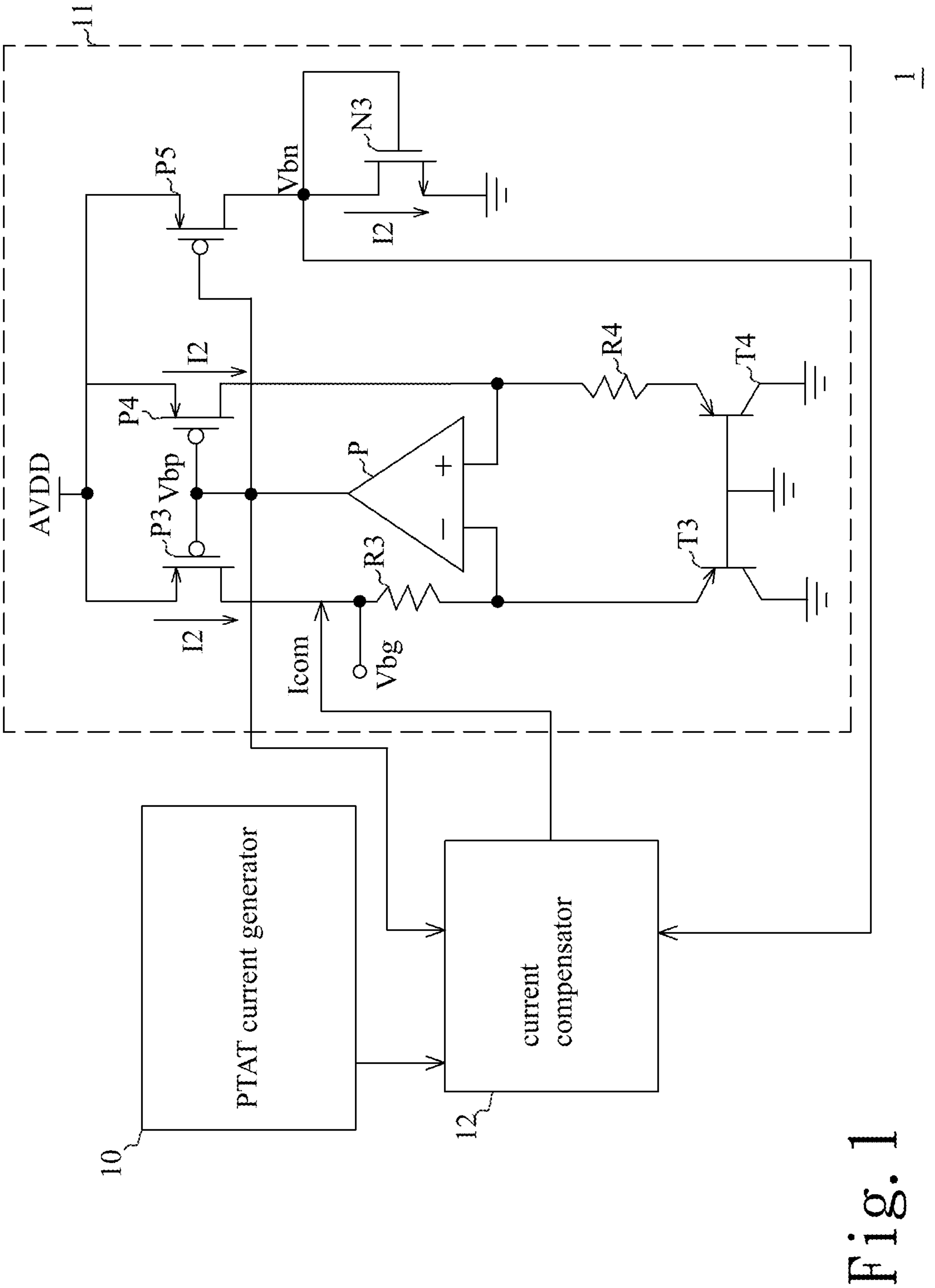
FIG. 1 is a diagram schematically illustrating a bandgap reference voltage generation device according to an embodiment of the invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as “can”, “could”, “might”, or “may”, usually attempt to express what the embodiment in the invention has, but it can also be interpreted as a feature, element, or step that may not be needed. In other embodiments, these features, elements, or steps may not be required.

Reference throughout this specification to “one embodiment” or “an embodiment” means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

In the following description, a bandgap reference voltage generation device will be described. The bandgap reference voltage generation device uses a simple circuit configuration and performs subtraction and addition on a first proportional to absolute temperature (PTAT) current and a second PTAT current to generate a compensation current, thereby achieving low-cost and low-power temperature compensation without using any absolute temperature (CTAT) current. The bandgap reference voltage generation devices described below may also be applied to other circuit configurations.

FIG. 1 is a diagram schematically illustrating a bandgap reference voltage generation device according to an embodiment of the invention. Referring to FIG. 1, a bandgap reference voltage generation device 1 will be introduced as follows. The bandgap reference voltage generation device 1 includes at least one proportional to absolute temperature (PTAT) current generator 10, a bandgap reference voltage generation circuit 11, and a current compensator 12. For clarity and convenience, the embodiment exemplifies one PTAT current generator 10. The current compensator 12 is coupled to the PTAT current generator 10 and the bandgap reference voltage generation circuit 11.

The operation of the bandgap reference voltage generation device 1 is introduced as follows. The PTAT current generator 10 generates a first proportional to absolute temperature (PTAT) current. The bandgap reference voltage generation circuit 11 generates a second proportional to absolute temperature (PTAT) current whose positive temperature coefficient is different from the positive temperature coefficient of the first PTAT current. The current compensator 12 retrieves the first PTAT current and the second PTAT current, performs subtraction and addition on the first PTAT current and the second PTAT current to generate a compensation current Icom, and transmits the compensation current Icom to the bandgap reference voltage generation circuit 11 to generate a zero temperature coefficient voltage Vbg, thereby achieving low-cost and low-power temperature compensation without using any absolute temperature (CTAT) current.

Figure 2:
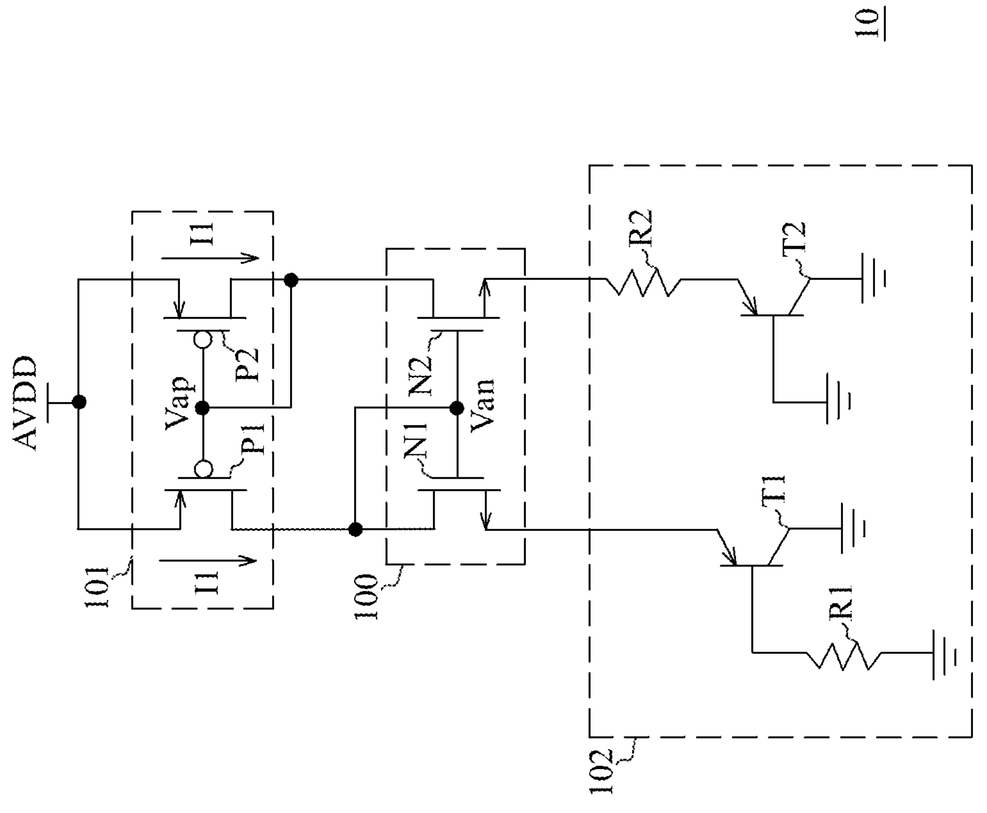
FIG. 2 is a diagram schematically illustrating a proportional to absolute temperature (PTAT) current generator according to a first embodiment of the invention.

FIG. 2 is a diagram schematically illustrating a proportional to absolute temperature (PTAT) current generator according to a first embodiment of the invention. Referring to FIG. 1 and FIG. 2, the first embodiment of the PTAT current generator 10 is introduced as follows. The PTAT current generator 10 may include, but is not limited to, at least one N-type current mirror 100, at least one P-type current mirror 101, and a voltage control circuit 102. For clarity and convenience, the first embodiment exemplifies one N-type current mirror 100 and one P-type current mirror 101. The P-type current mirror 101 is electrically cascoded between the N-type current mirror 100 and a supply voltage AVDD. The voltage control circuit 102 is electrically coupled between the N-type current mirror 100 and a reference voltage. The reference voltage may be, but not limited to, a grounding voltage. The first PTAT current I1 sequentially flows through the P-type current mirror 101, the N-type current mirror 100, and the voltage control circuit 102 to control two nodes between the N-type current mirror 100 and the voltage control circuit 102 to have different voltage. The control terminal of the P-type current mirror 101 has a control voltage Vap. The control terminal of the N-type current mirror 100 has a control voltage Van.

Specifically, the N-type current mirror 100 includes a first N-type field-effect transistor (FET) N1 and a second N-type field-effect transistor (FET) N2 with sources thereof coupled to the voltage control circuit 102. The drain and the gate of the first N-type FET N1 are coupled to each other and coupled to the gate of the second N-type FET N2. The voltage control circuit 102 controls the sources of the first N-type FET N1 and the second N-type FET N2 to have different voltages. The gates of the first N-type FET N1 and the second N-type FET N2 are used as the control terminal of the N-type current mirror 100. The P-type current mirror 101 includes a first P-type FET P1 and a second P-type FET P2 with sources thereof electrically connected to the supply voltage AVDD. The drain and the gate of the second P-type FET P2 are coupled to each other and coupled to the gate of the first P-type FET P1. The drains of the first P-type FET P1 and the second P-type FET P2 are respectively coupled to the drains of the first N-type FET N1 and the second N-type FET N2. The gates of the first P-type FET P1 and the second P-type FET P2 are used as the control terminal of the P-type current mirror 101.

The voltage control circuit 102 may include, but is not limited to, a first PNP bipolar junction transistor (BJT) T1, a first resistor R1, a second PNP bipolar junction transistor (BJT) T2, and a second resistor R2. The emitter of the first PNP BJT T1 is coupled to the source of the first N-type FET N1. The collector of the first PNP BJT T1 is coupled to the reference voltage. The first resistor R1 is coupled between the reference voltage and the base of the first PNP BJT T1. The collector and the base of the second PNP BJT T2 are coupled to the reference voltage. The second resistor R2 is coupled between the source of the second N-type FET N2 and the emitter of the second PNP BJT T2. In order to control the sources of the first N-type FET N1 and the second N-type FET N2 to have different voltages, the first PTAT current I1 flows through the first P-type FET P1, the second P-type FET P2, the first N-type FET N1, the second N-type FET N2, the first PNP BJT T1, and the second PNP BJT T2. In addition, the first N-type FET N1 and the second N-type FET N2 operate in a subthreshold region.

Preferably, the first N-type FET N1 and the second N-type FET N2 are different types of metal-oxide-semiconductor (MOS) FETs, so that the threshold voltage of the first N-type FET N1 is different from the threshold voltage of the second N-type FET N2. In detail, while the first N-type FET N1 and the second N-type FET N2 with different threshold voltages operate in the subthreshold region, a difference between the gate-source voltages of the first N-type FET N1 and the second N-type FET N2 is substantially equal to the voltage difference between the threshold voltages of the first N-type FET N1 and the second N-type FET N2 according to current-voltage (I-V) characteristics of transistors. Further explanation is presented with equations (1-1) and (1-2) and equation (2) in the following. While the first N-type FET N1 and the second N-type FET N2 operate in the subthreshold region and drain-source voltages of the first N-type FET N1 and the second N-type FET N2 are both larger than four times a thermal voltage $V_T$, I-V characteristics of the first N-type FET N1 and the second N-type FET N2 can be represented by equations 1-1 and 1-2:

$$I_{D\_N1} = \mu V_T^2 \left[\frac{W}{L}\right]_{N1} \exp\left[\frac{V_{GS\_N1} - V_{th\_N1}}{\mathrm{m}V_T}\right] \tag{1-1}$$

$$I_{D\_N2} = \mu V_T^2 \left[\frac{W}{L}\right]_{N2} \exp\left[\frac{V_{GS\_N2} - V_{th\_N2}}{\mathrm{m}V_T}\right] \tag{1-2}$$

$I_{D\_N1}$ and $I_{D\_N2}$ are taken as the drain-source currents of the first N-type FET N1 and the second N-type FET N2, μ is trench carrier mobility, $V_{GS\_N1}$ and $V_{GS\_N2}$ are respectively the gate-source voltages of the first N-type FET N1 and the second N-type FET N2, $V_{th\_N1}$ and $V_{th\_N2}$ are respectively the threshold voltages of the first N-type FET N1 and the second N-type FET N2, m is a factor of slope in a subthreshold region, $[W/L]_{N1}$ is the width-length ratio of the first N-type FET N1, and $[W/L]_{N2}$ is the width-length ratio of the second N-type FET N2. If $I_{D\_N1}=I_{D\_N2}$, and $[W/L]_{N1}=[W/L]_{N2}$, equations 1-1 and 1-2 can be simplified as equation 2.

$$V_{GS\_N1} - V_{th\_N1} = V_{GS\_N2} - V_{th\_N2} \Longrightarrow V_{GS\_N2} - V_{GS\_N1} = V_{th\_N2} - V_{th\_N1} \tag{2}$$

In other words, from equation 2, if the first N-type FET N1 and the second N-type FET N2 operate in a subthreshold region and the drain-source voltages of the first N-type FET N1 and the second N-type FET N2 are both larger than four times the thermal voltage $V_T$, a voltage difference between the gate-source voltages of the first N-type FET N1 and the second N-type FET N2 is equal to a voltage difference between the threshold voltages of the first N-type FET N1 and the second N-type FET N2.

In some embodiments of the invention, the bandgap reference voltage generation circuit 11 may include, but is not limited to, a third P-type FET P3, a fourth P-type FET P4, a fifth P-type FET P5, a third N-type FET N3, a third PNP BJT T3, a fourth PNP BJT T4, a third resistor R3, a fourth resistor R4, and a comparator P. The sources of the third P-type FET P3 and the fourth P-type FET P4 are coupled to the supply voltage AVDD. The gates of the third P-type FET P3 and the fourth P-type FET P4, coupled to each other and coupled to the output terminal of the comparator P and the current compensator 12, have a control voltage Vbp. The bases of the third PNP BJT T3 and the fourth PNP BJT T4 are coupled to each other and coupled to the reference voltage. The collectors of the third PNP BJT T3 and the fourth PNP BJT T4 are coupled to the reference voltage. The emitter of the third PNP BJT T3 is coupled to the drain of the third P-type FET P3 through the third resistor R3. The negative input terminal of the comparator P is coupled to a node between the third resistor R3 and the emitter of the third PNP BJT T3. A node between the drain of the third P-type FET P3 and the third resistor R3, coupled to the current compensator 12, receives the compensation current Icom to generate the zero temperature coefficient voltage Vbg. The emitter of the fourth PNP BJT T4 is coupled to the drain of the fourth P-type FET P4 through the fourth resistor R4. The positive input terminal of the comparator P is coupled to a node between the fourth resistor R4 and the drain of the fourth P-type FET P4. The gate of the fifth P-type FET P5 is coupled to the gates of the third P-type FET P3 and the fourth P-type FET P4. The source of the fifth P-type FET P5 is coupled to the supply voltage AVDD. The drain of the fifth P-type FET P5, coupled to the drain and the gate of the third N-type FET N3, has a voltage Vbn. The source of the third N-type FET N3 is coupled to the reference voltage. The second PTAT current I2 flows through the third P-type FET P3, the fourth P-type FET P4, the fifth P-type FET P5, the third N-type FET N3, the third PNP BJT T3, the fourth PNP BJT T4, the third resistor R3, and the fourth resistor R4.

Figure 3:
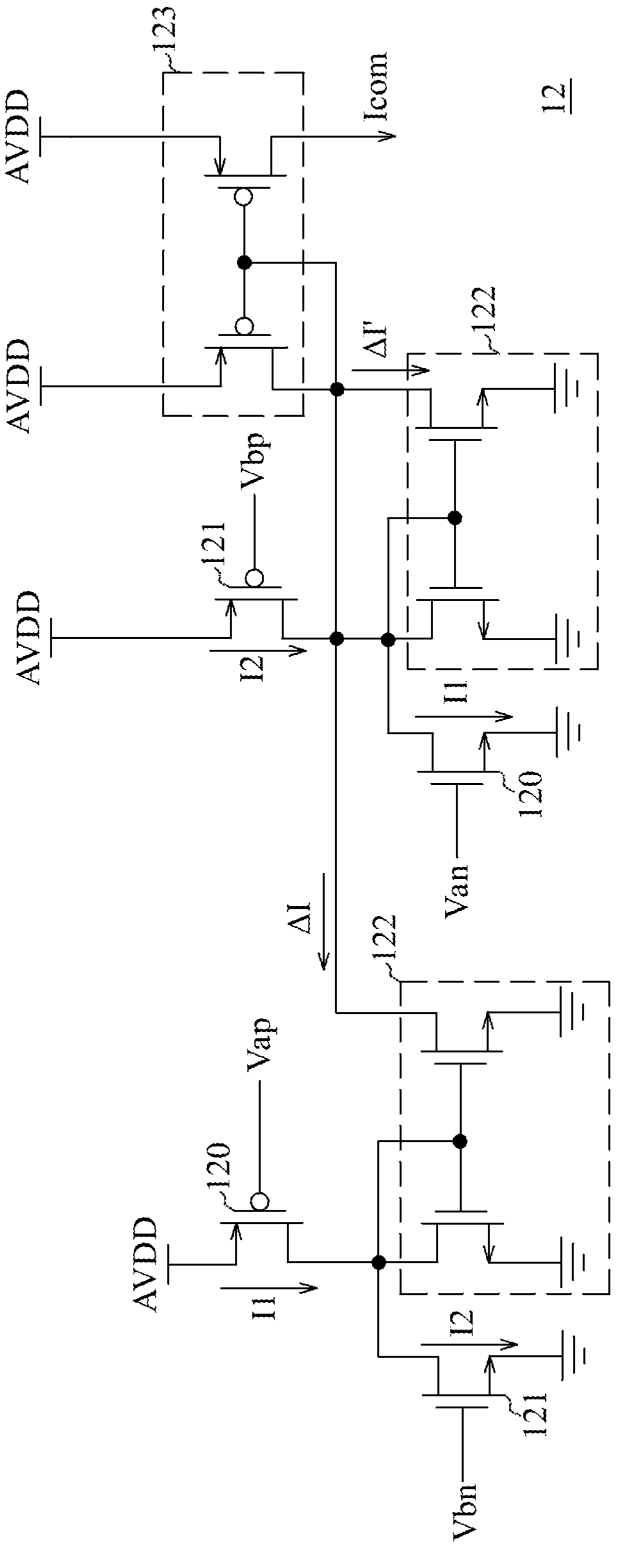
FIG. 3 is a diagram schematically illustrating a current compensator according to an embodiment of the invention.

FIG. 3 is a diagram schematically illustrating a current compensator according to an embodiment of the invention. Referring to FIG. 1, FIG. 2, FIG. 3, the current compensator 12 is introduced as follows. The current compensator 12 may include, but is not limited to, a plurality of first controlled current sources 120, a plurality of second controlled current sources 121, a plurality of current subtractors 122, and a current adder 123. For clarity and convenience, the embodiment exemplifies two first controlled current sources 120 and two second controlled current sources 121. The control terminal of one of the first controlled current sources 120, coupled to the gates of the first P-type FET P1 and the second P-type FET P2 of the PTAT current generator 10, receives the control voltage Vap. The control terminal of another of the first controlled current sources 120, coupled to the gates of the first N-type FET N1 and the second N-type FET N2 of the PTAT current generator 10, receives the control voltage Van. The control terminal of one of the second controlled current sources 121, coupled to the drain of the N-type FET P3 of the bandgap reference voltage generation circuit 11, receives the voltage Vbn. The control terminal of another of the second controlled current sources 121, coupled to the gates of the P-type FETs P3 and P4 of the bandgap reference voltage generation circuit 11, receives the control voltage Vbp. The current subtractors 122 are respectively coupled to the first controlled current sources 120 and respectively coupled to the second controlled current sources 121. The current adder 123 is coupled to the current subtractors 122 and the node between the drain of the third P-type FET P3 and the third resistor R3 of the bandgap reference voltage generation circuit 11.

Specifically, one of the first controlled current sources 120 is coupled between the supply voltage AVDD and the corresponding current subtractor 122 and another of the first controlled current sources 120 is coupled between the reference voltage and the corresponding current subtractor 122. The first controlled current sources 120 may be respectively, but not limited to, a P-type field-effect transistor (FET) and an N-type field-effect transistor (FET). One of the second controlled current sources 121 is coupled between the supply voltage AVDD and the corresponding current subtractor 122 and another of the second controlled current sources 121 is coupled between the reference voltage and the corresponding current subtractor 122. The second controlled current sources 121 may be respectively, but not limited to, a P-type field-effect transistor (FET) and an N-type field-effect transistor (FET). The current subtractors 122 are coupled to the reference voltage. The current subtractors 122 may be, but not limited to, N-type current mirrors. The current adder 123 is coupled to the supply voltage AVDD. The current adder 123 may be, but not limited to, a P-type current mirror.

The operation of the current compensator 12 is introduced as follows. The first controlled current sources 120 respectively generate the first PTAT currents I1 in response to the control voltages Vap and Van. The second controlled current sources 121 respectively generate the second PTAT currents I2 in response to the control voltage Vbp and the voltage Vbn. One of the current subtractors 122 receives the corresponding first PTAT currents I1 and the corresponding second PTAT currents I2 and performs subtraction on the corresponding first PTAT currents I1 and the corresponding second PTAT currents I2 to generate a difference current ΔI. Another of the current subtractors 122 receives the corresponding first PTAT currents I1 and the corresponding second PTAT currents I2 and performs subtraction on the corresponding first PTAT currents I1 and the corresponding second PTAT currents I2 to generate another difference current ΔI'. The current adder 123 receives the difference currents ΔI and ΔI' and performs addition on the difference currents ΔI and ΔI' to generate the compensation current Icom.

Figure 4A:
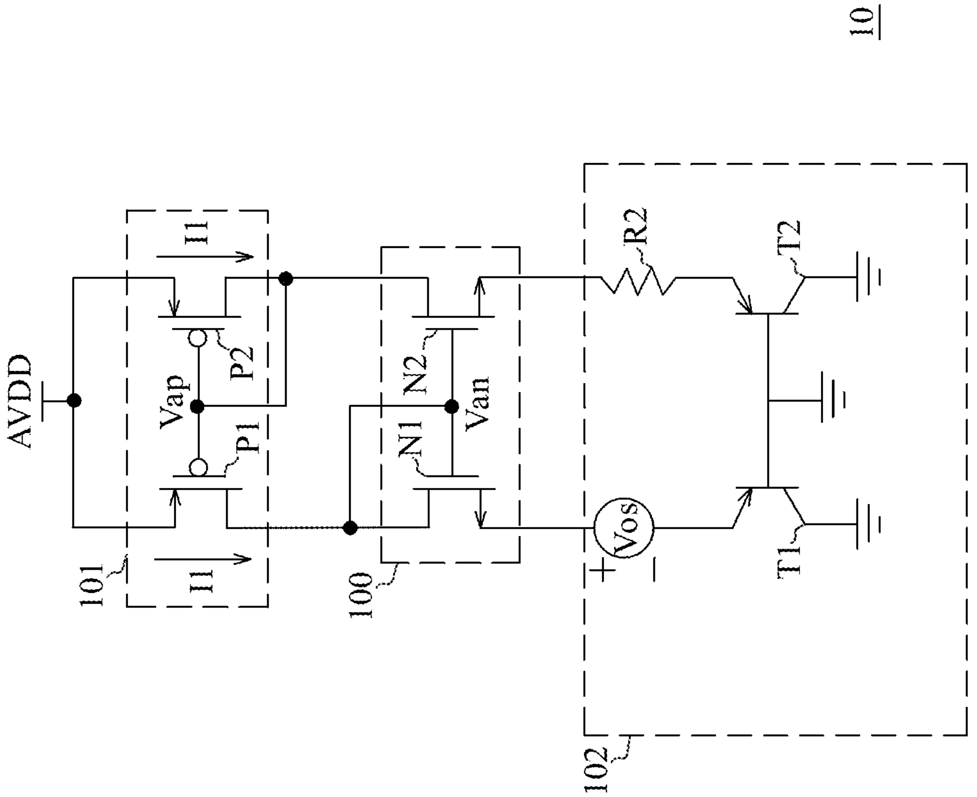
FIG. 4*a* is a diagram schematically illustrating a proportional to absolute temperature (PTAT) current generator according to an embodiment of the invention.
Figure 4B:
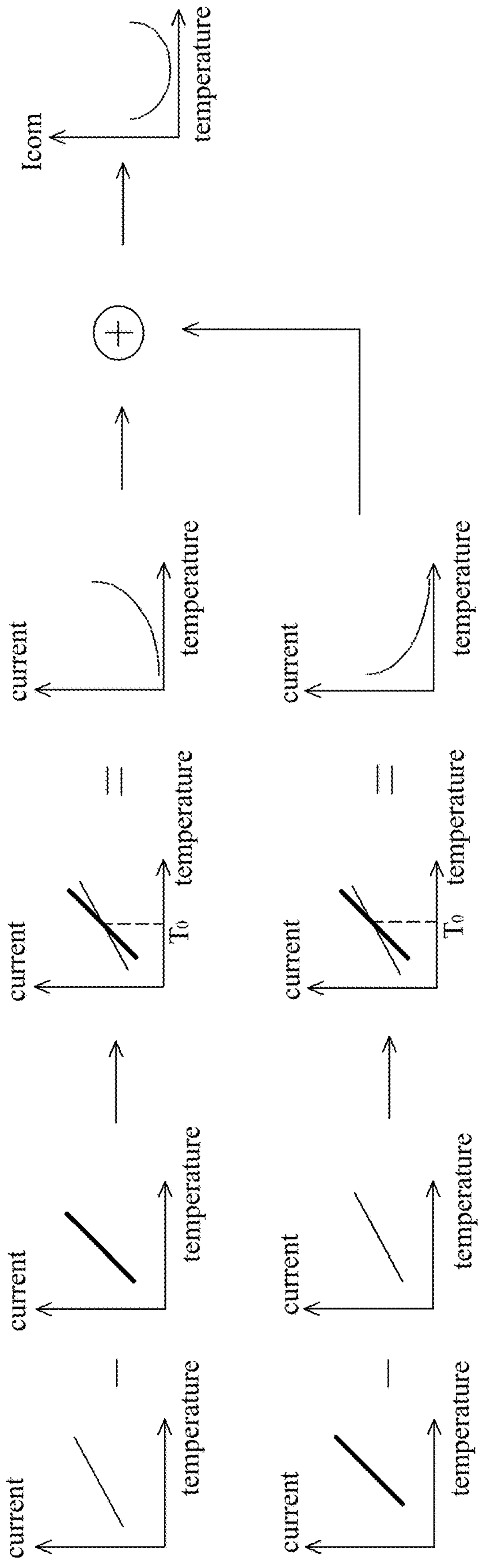
FIG. 4*b* is a diagram schematically illustrating the curves of a first PTAT current, a second PTAT current, and a compensation current according to an embodiment of the invention.

FIG. 4*a* is a diagram schematically illustrating a proportional to absolute temperature (PTAT) current generator according to an embodiment of the invention. FIG. 4*b* is a diagram schematically illustrating the curves of a first PTAT current, a second PTAT current, and a compensation current according to an embodiment of the invention. The embodiment of FIG. 4*a* is different from the embodiment of FIG. 2 in the voltage control circuit 102. The other features of FIG. 4*a* have been described in the embodiment of FIG. 2 so they will not be reiterated. As illustrated in FIG. 4*a*, the voltage control circuit 102 includes a first PNP bipolar junction transistor (BJT) T1, an offset voltage source Vos that is the function of temperature, a second PNP bipolar junction transistor (BJT) T2, and a second resistor R2. The emitter of the first PNP BJT T1 is coupled to the source of the first N-type FET N1 through the offset voltage source Vos. The collector and the base of the first PNP BJT T1 are coupled to the reference voltage. The collector and the base of the second PNP BJT T2 are coupled to the reference voltage. The second resistor R2 is coupled between the source of the second N-type FET N2 and the emitter of the second PNP BJT T2. In order to control the sources of the first N-type FET N1 and the second N-type FET N2 to have different voltages, the offset voltage source Vos is required. Assume that the second PNP BJT T2 consists of N pieces of the first PNP BJTs T1. The first PTAT current I1 is expressed by equation (3).

$$I1 = \frac{V_T lnN}{r2} + K(T) = \frac{V_{EB1} - V_{EB2} + V_{OS}(T)}{r2} \approx aT \Longrightarrow \frac{\partial I1}{\partial T} = \frac{klnN}{r2} + K'(T) \tag{3}$$

In equation (3), r2 represents the resistance of the second resistor R2, $V_{EB1}$ represents the emitter-base voltage of the first PNP BJT T1, $V_{EB2}$ represents the emitter-base voltage of the second PNP BJT T2, T represents temperature, a is a positive integer, and k represents the Boltzmann constant. Referring to FIG. 1, the second PTAT current I2 is expressed by equation (4).

$$I2 = \frac{V_T lnN}{r4} = \frac{V_{EB3} - V_{EB4}}{r4} \approx bT \Longrightarrow \frac{\partial I2}{\partial T} = \frac{klnN}{r4} \tag{4}$$

In equation (4), r4 represents the resistance of the fourth resistor R4, $V_{EB3}$ represents the emitter-base voltage of the third PNP BJT T3, $V_{EB4}$ represents the emitter-base voltage of the fourth PNP BJT T4, and b is a positive integer. Let I1($T_0$)=I2($T_0$) and $$\frac{\partial I1}{\partial T} \neq \frac{\partial I2}{\partial T},$$

as illustrated in FIG. 4*b*.

As illustrated in FIG. 3 and FIG. 4*b*, a thin straight line and a thick straight line respectively represent the first PTAT current I1 and the second PTAT current I2. FIG. 4*b* shows subtraction and addition performed on the first PTAT current I1 and the second PTAT current I2 to obtain the compensation current Icom. When I1 is greater than I2, Icom≈(a−b)T. When I1 is less than I2, Icom≈(b−a)T. Icom is not sensitive to the base-emitter voltage. As result, Icom is difficultly affected by process drift and used for single-point temperature compensation to achieve low-cost calibration. Since Icom is extraneous to the base-emitter voltage, Icom does not face a trade-off between area and power consumption. Thus, the requirements for low consumption and low cost can be achieved. In addition, the bandgap reference voltage generation device 1 of FIG. 1 is a simple circuit configuration suitable for mass production.

Figure 5:
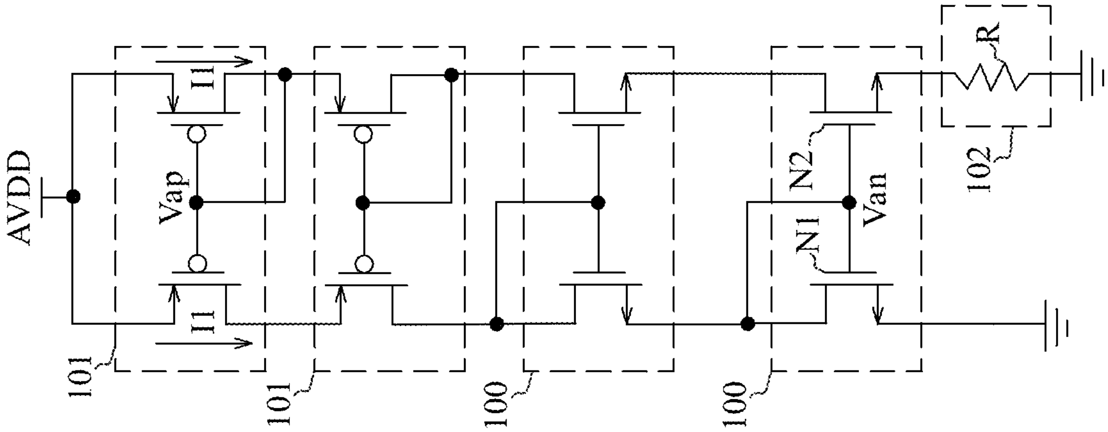
FIG. 5 is a diagram schematically illustrating a proportional to absolute temperature (PTAT) current generator according to a second embodiment of the invention.

FIG. 5 is a diagram schematically illustrating a proportional to absolute temperature (PTAT) current generator according to a second embodiment of the invention. The embodiment of FIG. 5 is different from the embodiment of FIG. 2 in the numbers of the N-type current mirror 100 and the P-type current mirror 101 and the voltage control circuit 102. The other features of FIG. 5 have been described in the embodiment of FIG. 2 so they will not be reiterated. As illustrated in FIG. 5, there are two N-type current mirrors 100 and two P-type current mirrors 101. The first N-type FET N1 of the N-type current mirror 100 closest to the voltage control circuit 102 has a source that is directly coupled to the reference voltage. The voltage control circuit

102 includes a resistor R coupled between the reference voltage and the source of the second N-type FET N2. The first PTAT current I1 can flow through the resistor R. As a result, the sources of the first N-type FET N1 and the second N-type FET N2 of the N-type current mirror 100 closest to the voltage control circuit 102 have different voltages.

Figure 6:
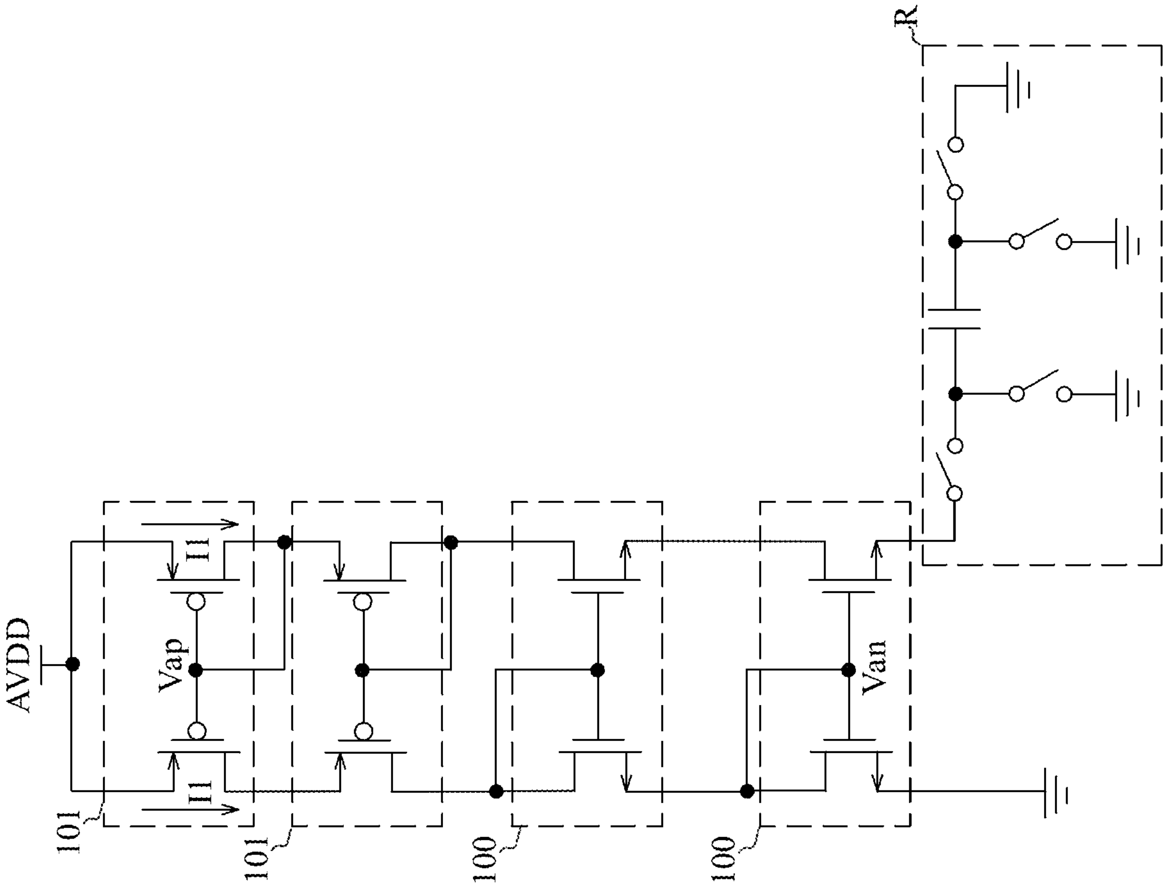
FIG. 6 is a diagram schematically illustrating a proportional to absolute temperature (PTAT) current generator according to a third embodiment of the invention.

FIG. 6 is a diagram schematically illustrating a proportional to absolute temperature (PTAT) current generator according to a third embodiment of the invention. The resistor R of FIG. 5 is implemented with a switched-capacitor resistor to form the third embodiment of FIG. 6, thereby reducing a more layout area.

Figure 7:
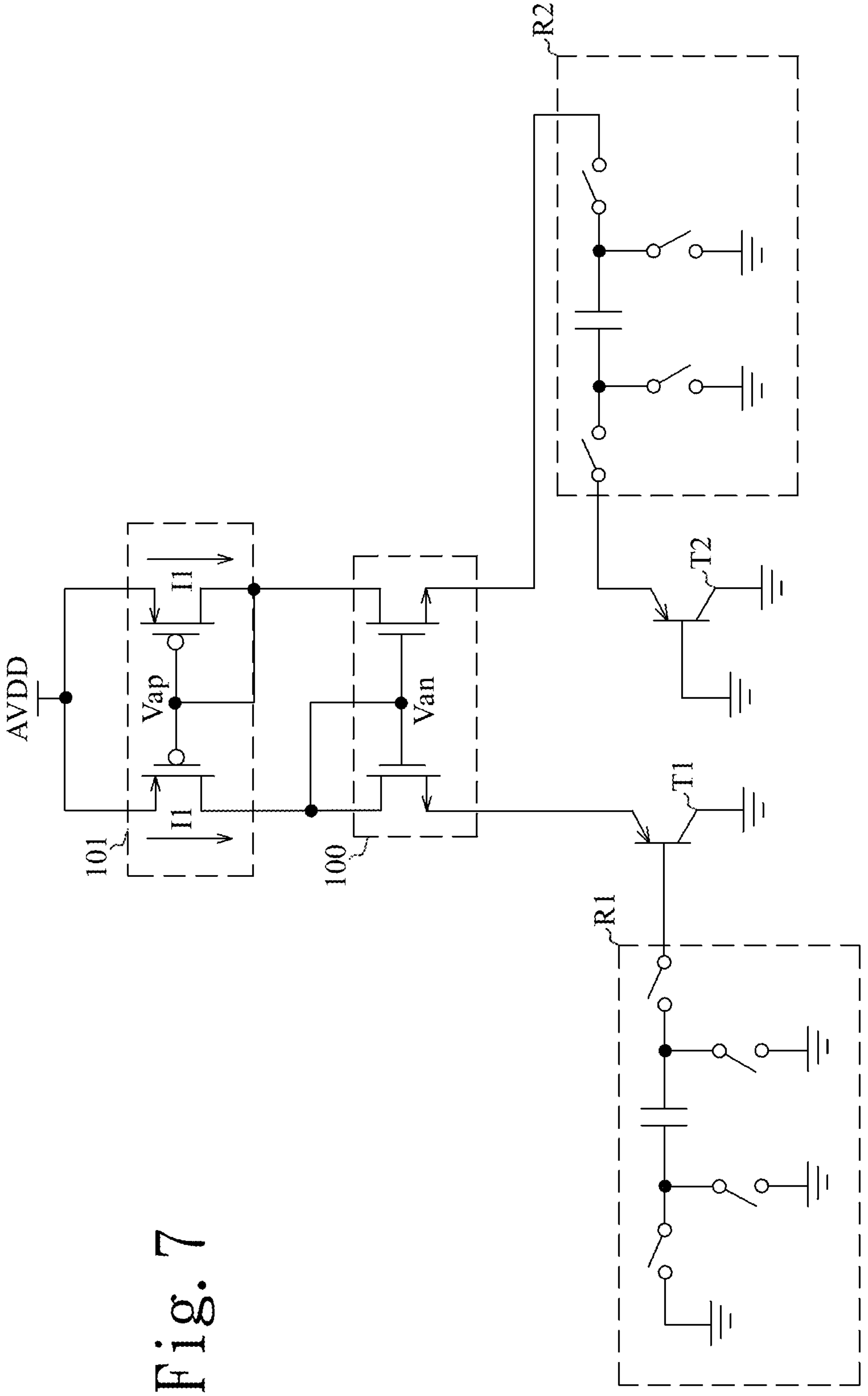
FIG. 7 is a diagram schematically illustrating a proportional to absolute temperature (PTAT) current generator according to a fourth embodiment of the invention.

FIG. 7 is a diagram schematically illustrating a proportional to absolute temperature (PTAT) current generator according to a fourth embodiment of the invention. The first resistor R1 and the second resistor R2 of FIG. 2 are implemented with switched-capacitor resistors to form the fourth embodiment of FIG. 7, thereby reducing a more layout area.

Figure 8:
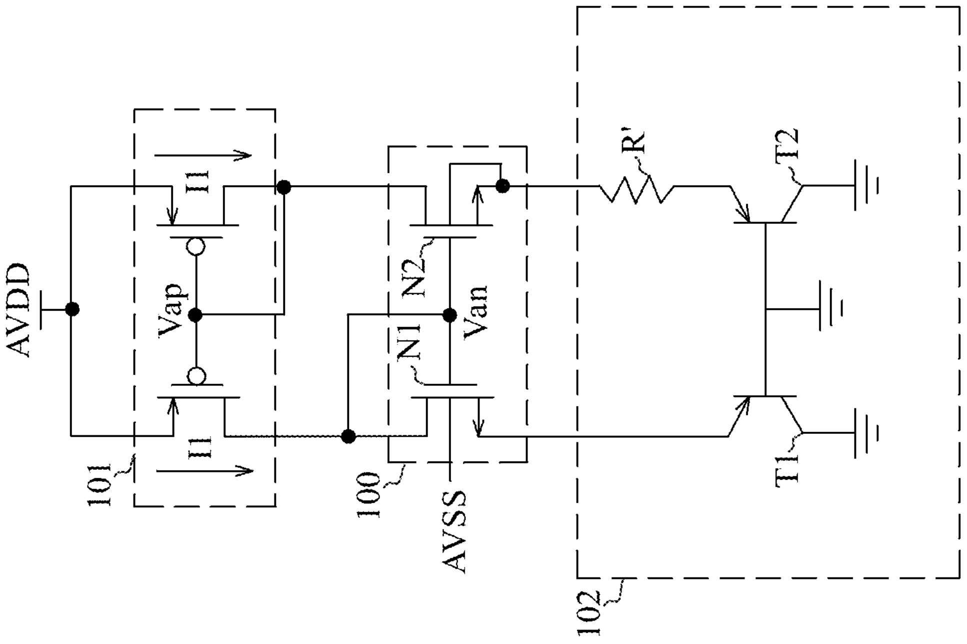
FIG. 8 is a diagram schematically illustrating a proportional to absolute temperature (PTAT) current generator according to a fifth embodiment of the invention.

FIG. 8 is a diagram schematically illustrating a proportional to absolute temperature (PTAT) current generator according to a fifth embodiment of the invention. The embodiment of FIG. 2 is different from the embodiment of FIG. 8 in the voltage control circuit 102 and the N-type current mirror 100. The other features of FIG. 8 have been described in the embodiment of FIG. 2 so they will not be reiterated. As illustrated in FIG. 8, the voltage control circuit 102 includes a first PNP bipolar junction transistor (BJT) T1, a second PNP bipolar junction transistor (BJT) T2, and a resistor R'. The bases and the collectors of the first PNP BJT T1 and the second PNP BJT T2 are coupled to the reference voltage. The emitter of the first PNP BJT is directly coupled to the source of the first N-type FET N1. The resistor R' is coupled between the emitter of the second PNP BJT T2 and the source of the second N-type FET N2. The first PTAT current I1 flows through the first N-type FET N1, the second N-type FET N2, the first PNP BJT T1, the resistor R', and the second PNP BJT T2. In order to control the sources of the first N-type FET N1 and the second N-type FET N2 to have different voltage, the body of the first N-type FET N1 is coupled to a bias voltage that is less than the supply voltage and the reference voltage, the source of the first N-type FET N1 is coupled to the emitter of the first PNP BJT T1, and the body and the source of the second N-type FET N2 are coupled to each other and coupled to the resistor R'.

Figure 9:
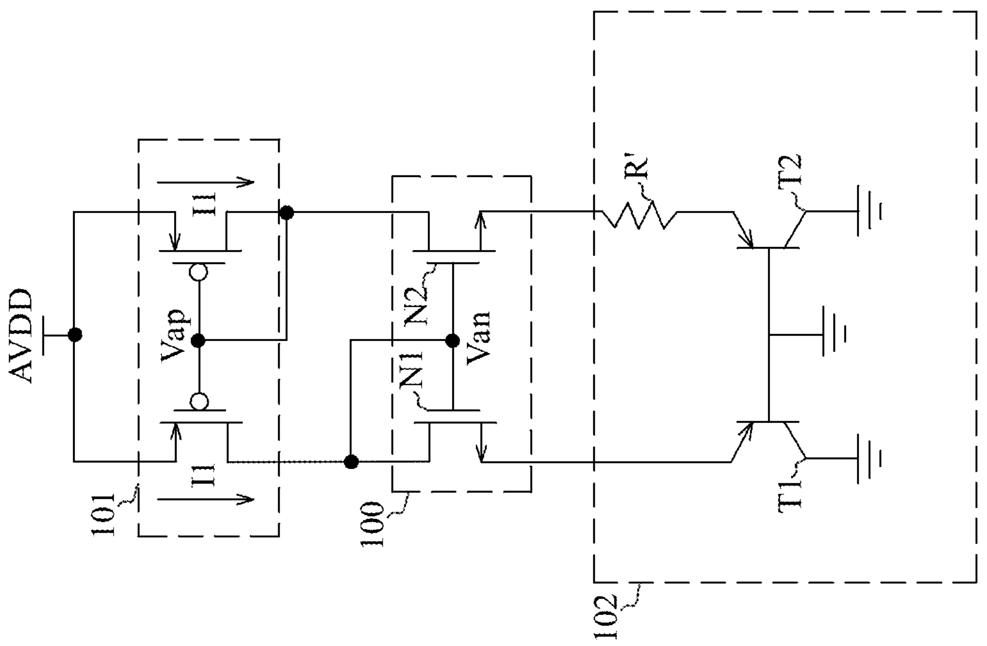
FIG. 9 is a diagram schematically illustrating a proportional to absolute temperature (PTAT) current generator according to a sixth embodiment of the invention.

FIG. 9 is a diagram schematically illustrating a proportional to absolute temperature (PTAT) current generator according to a sixth embodiment of the invention. The embodiment of FIG. 2 is different from the embodiment of FIG. 9 in the voltage control circuit 102 and the N-type current mirror 100. The other features of FIG. 9 have been described in the embodiment of FIG. 2 so they will not be reiterated. As illustrated in FIG. 9, the voltage control circuit 102 includes a first PNP bipolar junction transistor (BJT) T1, a second PNP bipolar junction transistor (BJT) T2, and a resistor R'. The bases and the collectors of the first PNP BJT T1 and the second PNP BJT T2 are coupled to the reference voltage. The emitter of the first PNP BJT is directly coupled to the source of the first N-type FET N1. The resistor R' is coupled between the emitter of the second PNP BJT T2 and the source of the second N-type FET N2. The first PTAT current I1 flows through the first N-type FET N1, the second N-type FET N2, the first PNP BJT T1, the resistor R', and the second PNP BJT T2. In order to control the sources of the first N-type FET N1 and the second N-type FET N2 to have different voltage, the first N-type FET and the second N-type FET have different channel lengths.

According to the embodiments provided above, the bandgap reference voltage generation device uses the simple circuit configuration and performs subtraction and addition on the first PTAT current and the second PTAT current to generate the compensation current, thereby achieving low-cost and low-power temperature compensation without using any CTAT current.

The embodiments described above are only to exemplify the invention and not to limit the scope of the invention. Therefore, any equivalent modification or variation according to the shapes, structures, features, or spirit disclosed by the invention is to be also included within the scope of the invention.

What is claimed is:

1. A bandgap reference voltage generation device, comprising:

at least one proportional to absolute temperature (PTAT) current generator configured to generate a first proportional to absolute temperature (PTAT) current;

a bandgap reference voltage generation circuit configured to generate a second proportional to absolute temperature (PTAT) current whose positive temperature coefficient is different from a positive temperature coefficient of the first PTAT current; and a current compensator coupled to the at least one PTAT current generator and the bandgap reference voltage generation circuit and configured to retrieve the first PTAT current and the second PTAT current, perform subtraction and addition on the first PTAT current and the second PTAT current to generate a compensation current, and transmit the compensation current to the bandgap reference voltage generation circuit to generate a zero temperature coefficient voltage.

2. The bandgap reference voltage generation device according to claim 1, wherein the at least one PTAT current generator comprises:

at least one N-type current mirror;

at least one P-type current mirror electrically cascoded between the at least one N-type current mirror and a supply voltage; and a voltage control circuit electrically coupled between the at least one N-type current mirror and a reference voltage and configured to control the at least one N-type current mirror to generate the first PTAT current.

3. The bandgap reference voltage generation device according to claim 2, wherein the at least one N-type current mirror comprises a first N-type field-effect transistor (FET) and a second N-type field-effect transistor (FET) with sources thereof coupled to the voltage control circuit, and the voltage control circuit is configured to control the sources of the first N-type FET and the second N-type FET to have different voltages.

4. The bandgap reference voltage generation device according to claim 3, wherein the first N-type FET and the second N-type FET are configured to operate in a subthreshold region.

5. The bandgap reference voltage generation device according to claim 4, wherein the voltage control circuit comprises a resistor coupled between the reference voltage and the source of the second N-type FET and the source of the first N-type FET is coupled to the reference voltage.

6. The bandgap reference voltage generation device according to claim 5, wherein the resistor is a switched-capacitor resistor.

7. The bandgap reference voltage generation device according to claim 4, wherein the voltage control circuit comprises:

a first PNP bipolar junction transistor (BJT) with an emitter thereof coupled to the source of the first N-type FET, and a collector of the first PNP BJT is coupled to the reference voltage;

a first resistor coupled between the reference voltage and a base of the first PNP BJT;

a second PNP bipolar junction transistor (BJT) with a collector and a base thereof coupled to the reference voltage; and a second resistor coupled between the source of the second N-type FET and an emitter of the second PNP BJT.

8. The bandgap reference voltage generation device according to claim 7, wherein the first resistor and the second resistor are switched-capacitor resistors.

9. The bandgap reference voltage generation device according to claim 3, wherein the voltage control circuit comprises:

a first PNP bipolar junction transistor (BJT) and a second PNP bipolar junction transistor (BJT) with bases and collectors thereof coupled to the reference voltage, wherein an emitter of the first PNP BJT is coupled to the source of the first N-type FET; and a resistor coupled between an emitter of the second PNP BJT and the source of the second N-type FET.

10. The bandgap reference voltage generation device according to claim 9, wherein a body of the first N-type FET is coupled to a bias voltage that is less than the supply voltage and the reference voltage, the source of the first N-type FET is coupled to the emitter of the first PNP BJT, and a body and the source of the second N-type FET are coupled to each other and coupled to the resistor.

11. The bandgap reference voltage generation device according to claim 9, wherein the first N-type FET and the second N-type FET have different channel lengths.

12. The bandgap reference voltage generation device according to claim 1, wherein the current compensator comprises:

a plurality of first controlled current sources with control terminals thereof coupled to the at least one PTAT current generator, wherein each of the plurality of first controlled current sources is configured to generate the first PTAT current;

a plurality of second controlled current sources with control terminals thereof coupled to the bandgap reference voltage generation circuit, wherein each of the plurality of second controlled current sources is configured to generate the second PTAT current;

a plurality of current subtractors respectively coupled to the plurality of first controlled current sources and respectively coupled to the plurality of second controlled current sources, wherein each of the plurality of current subtractors is configured to perform the subtraction on the corresponding first PTAT current and the corresponding second PTAT current to generate a current difference; and a current adder coupled to the plurality of current subtractors and the bandgap reference voltage generation circuit and configured to perform the addition on the current differences generated by the plurality of current subtractors to generate the compensation current.

13. The bandgap reference voltage generation device according to claim 12, wherein the plurality of first controlled current sources comprise two first controlled current sources, one of the two first controlled current sources is coupled between the supply voltage and the corresponding current subtractor, and another of the two first controlled current sources is coupled between the reference voltage and the corresponding current subtractor.

14. The bandgap reference voltage generation device according to claim 13, wherein the two first controlled current sources are respectively a P-type field-effect transistor (FET) and an N-type field-effect transistor (FET).

15. The bandgap reference voltage generation device according to claim 12, wherein the plurality of second controlled current sources comprise two second controlled current sources, one of the two second controlled current sources is coupled between the supply voltage and the corresponding current subtractor, and another of the two second controlled current sources is coupled between the reference voltage and the corresponding current subtractor.

16. The bandgap reference voltage generation device according to claim 15, wherein the two second controlled current sources are respectively a P-type field-effect transistor (FET) and an N-type field-effect transistor (FET).

17. The bandgap reference voltage generation device according to claim 12, wherein the plurality of current subtractors are N-type current mirrors.

18. The bandgap reference voltage generation device according to claim 12, wherein the current adder is a P-type current mirror.

* * * * *